United States Patent

[11] 3,603,876

| [72] | Inventor | Reed H. Grundy |
| | | Murrysville, Pa. |
| [21] | Appl. No. | 879,732 |
| [22] | Filed | Nov. 25, 1969 |
| [45] | Patented | Sept. 7, 1971 |
| [73] | Assignee | Westinghouse Air Brake Company |
| | | Swissvale, Pa. |

[54] HIGH SPEED RATE INDICATOR HAVING IMPROVED METERING CIRCUIT
1 Claim, 2 Drawing Figs.

[52] U.S. Cl. ............................................. 324/78 J,
324/166, 324/105
[51] Int. Cl. ............................................. G01r 23/02,
G01p 3/12, G01r 11/18
[50] Field of Search .......................... 324/78 E,
78 I; 307/310, 253

[56] References Cited
UNITED STATES PATENTS
2,965,769 12/1960 Bell ............................. 307/253
2,999,168 9/1961 Henry .......................... 324/78 I UX
FOREIGN PATENTS
958,060 5/1964 Great Britain ................ 324/169

OTHER REFERENCES
Bokstein; Industrial Electronics Measurement & control; Sept., 1961; Bobbs-Merrill Co., Inc. pp.75-79;
Gross; Radio-Electronics; Sept. 1965, pp. 54-55

*Primary Examiner*—Alfred E. Smith
*Attorneys*—H. A. Williamson, A. G. Williamson, Jr. and J. B. Sotak ABSTRACT: This disclosure relates to a high rate parameter measuring system which uniquely allows extremely accurate rate measuring due to removal of indication nonlinearity as well as the removal of inaccuracies due to reading over wide ranges of ambient temperatures which are intrinsic to the environment of said system. The system incorporates pulse-squaring circuitry which square incoming rate pulses indicative of said rate parameter, associatively coupled to monostable circuitry including an operational amplifier which monostable circuitry provides a constant pulse-width output, said pulse-width output, said monostable circuitry output electrically coupled to a metering circuit which produces a linear indication of the rate of said incoming rate pulses and includes a solid state semiconductive component which uniquely cooperates with the aforementioned components to provide the desired results.

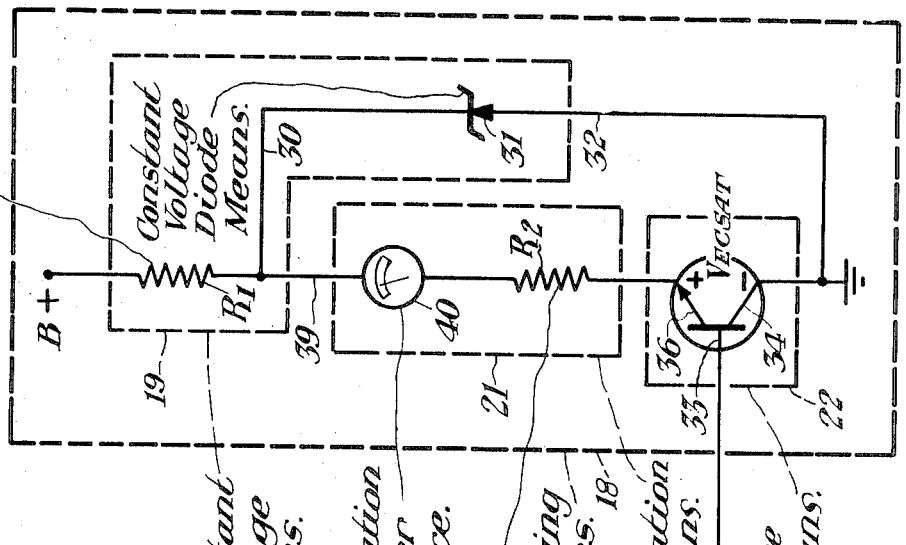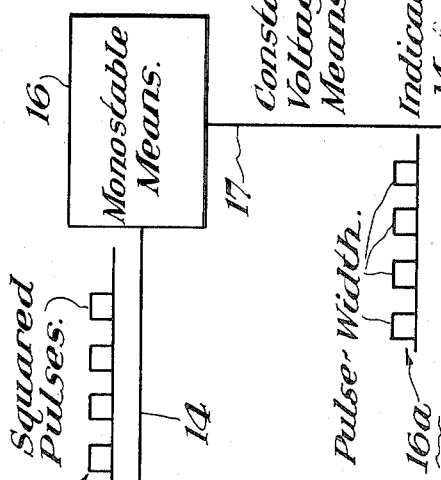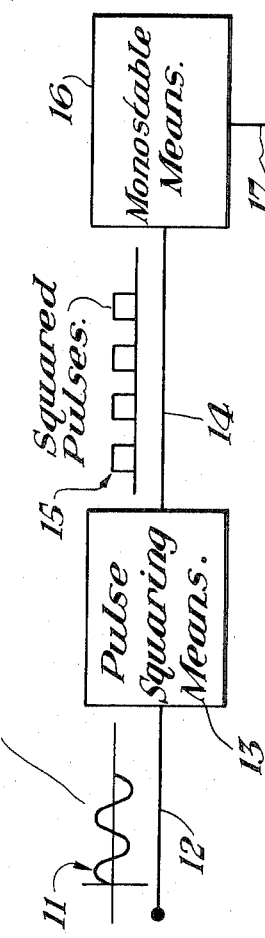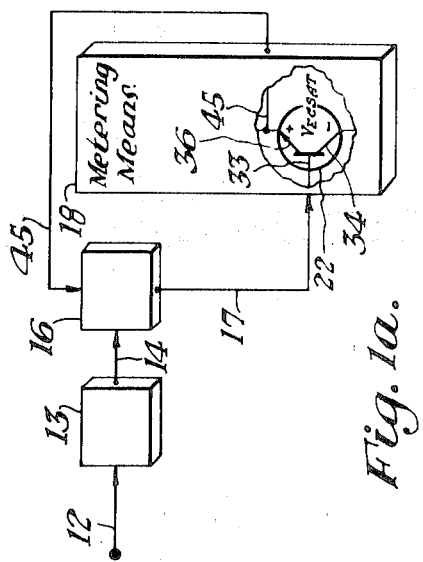

HIGH SPEED RATE INDICATOR HAVING IMPROVED METERING CIRCUIT

This invention relates to a high rate parameter measuring system.

More specifically, this invention relates to a high rate parameter measuring system which incorporates a metering unit for providing flawless linear measurement of a high rate parameter due to nonreaction to temperature variations. The metering unit includes a low temperature drift switching component, a constant voltage supply, and an indication device. The low temperature drift switching component has a constant pulse-width input pulse train and is electrically coupled to the constant voltage supply through the indication device and through a preselected reference node. The above-noted coupling provides for a relatively uniform current flow through the indication device whenever any of the constant-width pulses appears at the input of the low temperature drift switching component.

In prior art arrangements for measuring and indicating speed of moving objects, one main type of system employed with respect to measuring rates of incoming pulse trains which were rate parameters proportional to object speed, included transistor switching means with a grounded emitter electrode and a collector electrode connected to a time-averaging meter to provide an indication of object speed.

This type of speed-measuring arrangement gave rise to inaccuracy at substantially all frequencies developed due to relatively large temperature drifts in the transistor incorporated therein. These temperature drifts caused substantial variation in the collector to emitter saturation voltage $V_{CESAT}$, of the transistor, thus producing unreliable readings from the above-noted time-averaging meter.

The aforementioned and other disadvantages in prior art speed measuring and indication circuits being present, it is therefore desirable to employ a speed indication system which substantially eliminates such disadvantages.

It is therefore an object of this invention to provide a novel high rate parameter-measuring system which is stable with respect to component temperature variation.

Another object of this invention is to provide an improved high rate parameter-measuring system which provides a linear indication of the speed of a moving object.

Still another object of this invention is to provide a new and improved high rate parameter-measuring system which incorporates a semiconductive device which is relatively unaffected by temperature change and insures rate indication accuracy over high rate frequency ranges.

In the attainment of the foregoing objects, the present invention incorporates a high rate parameter-measuring system including in combination pulse-squaring means, monostable means, and metering means. The pulse-squaring means has an incoming rate signal indicative of a rate parameter and produces an output containing squared pulses corresponding to the incoming rate signal. The output of the pulse-squaring means is electrically connected to the monostable means. The monostable means is responsive to each pulse of the pulse-squaring means output to provide an output of constant-width pulses at a rate proportional to the above-noted rate parameter. The output of the monostable means is electrically coupled to the above-mentioned metering means. The metering means is responsive to the rate of the constant-width pulses on the output of the monostable means to provide a linear indication which is proportional to the aforementioned rate parameter. Included in the metering means is a low temperature drift switching means to insure the linearity of the indication from the metering means. This is due to the fact that the low temperature drift switching means is relatively unaffected by wide ranges of ambient temperatures which may be intrinsic to the environment of the system. Hence, relatively flawless measurement of the above-noted rate parameter is achieved.

Other objects and advantages of the present invention will become apparent from the ensuing description of illustrative embodiments thereof, in the course of which reference is had to the accompanying drawings in which:

FIG. 1 sets forth a preferred embodiment of the high rate parameter measuring system of the present invention.

FIG. 1a shows a connection between the low temperature drift switching means of the preferred embodiment in FIG. 1 to the monostable means of the preferred embodiment of FIG. 1 which connection assures that the monostable means is relatively unaffected by wide temperature ranges.

Referring now to FIG. 1 and viewing a preferred embodiment of the high rate parameter measuring system of the present invention, it will be seen that a conventional-type pulse-squaring means 13 having an input 12 is electrically coupled to a monostable means 16 via lead 14. The monostable means 16 is conventional and may be a Schmidt trigger which has an output 17 which is electrically coupled to a metering means or unit 18. Particularly, the output 17 of the monostable means 16 is electrically connected to a low temperature drift switching means 22, which in this preferred embodiment is a grounded collector NPN transistor having its base electrode 33 coupled to output 17, its collector electrode 34 coupled to a constant voltage means 19 through ground or some preselected reference node, and its emitter electrode 36 coupled to an indication means 21. The constant voltage means 19 includes a resistor $R_1$ supplied by a reference voltage B+, and electrically coupled to a Zener diode 31 via lead 30. The Zener diode 31 is also coupled to the collector electrode 34 of the transistor 22 through ground. Both the resistor $R_1$ and the Zener diode 31, which comprise constant voltage means 18, are electrically coupled to the indication means 21 via lead 39. The indication means 21 includes an indication impedance means which in this preferred embodiment is a resistor $R_2$ electrically coupled to an indication meter device 40. As shown, the low temperature drift switching means 22 is electrically coupled to the indication means 21 by the connection of emitter electrode 36 to resistor $R_2$ and the indication means 21 is electrically coupled to the constant voltage means 19 by the connection of indication meter device 40 to both resistor $R_1$ and Zener diode 31 through lead 39.

Referring now to the operation of the high rate parameter system 1 of FIG. 1, it will be seen that a periodic waveform 11, which waveform 11 is representative of a signal proportional to a rate parameter such as the speed of a moving object is input to a conventional pulse-squaring means 13 over lead 12. It will be appreciated that while the waveform 11 appears sinusoidal, any periodic waveform indicative of the desired rate parameter may be incorporated in the present invention. The pulse-squaring means 13 is designed to produce a pulse for each period of the periodic waveform input 11. An output waveform of square pulses 15 on lead 14 indicates the above-noted pulse production. It will be noted that the pulse-widths of the waveform 15 may vary in accordance with periodic frequency of the waveform 11 since the pulse-squaring means 13 is chosen to produce a leading pulse edge at a given positive threshold voltage with respect to periodic waveform 11 and a trailing pulse edge at another given voltage later on in time. Accordingly, the output squared-pulse waveform 15 of pulse-squaring means 13 is fed via lead 14 to a conventional monostable means 16, which by the employment of conventional operational amplifier means, not shown, assures a constant pulse-width output 16a on lead 17 for each incoming square pulse of waveform 15.

The constant pulse-width output 16a is fed to the low temperature drift switching means of metering means 18 which in the present embodiment is a transistor 22, and specifically to the base electrode 33 of transistor 22. As stated previously, the transistor 22 has its collector electrode 34 grounded, while its emitter electrode 36 is electrically connected at a potential above ground—just the reverse of normal transistor intercircuit connection! The reason for the above-noted present intercircuit connection of transistor 22 is that if with the normal type of transistor intercircuit connection, i.e., with emitter electrode 36 grounded and with collector electrode 34 connected at a potential above ground the collector-emitter voltage drop of transistor 22 at saturation, $V_{CESAT}$, would, as is well known, be relatively extremely susceptible to change with corresponding changes in transistor temperature. Accordingly, with different incoming pulses from lead 17, the resistor $R_2$ would pass different nonuniform currents when temperature variants were involved and therefore the indication meter device 40 would provide inaccurate readings. Contrawise, the transistor 22 being connected as shown in FIG. 1, the emitter-collector voltage drop of transistor 22 at saturation, $V_{ECSAT}$, is relatively unsusceptible to temperature variants. For example, as transistor temperature varies from 0° C. to 100° C., $V_{CESAT}$, would correspondingly change on the order of 2 to 1, but $V_{ECSAT}$ would only decrease on the order of 1.1 to 1. Since a typical value of $V_{CESAT}$ is about $100_{mv}$ and a typical value of $V_{ECSAT}$ is about $15_{mv}$, it will be appreciated that far less error is incorporated by employing the present type of transistor intercircuit connection. Hence, with the resistance $R_1$ and Zener diode 31 maintaining a constant voltage across the indication means 21 and transistor 22, there will be a substantially uniform current flowing through $R_2$ whenever a pulse is present on lead 17 at base electrode 33 of transistor 22. The indication meter device 40 being a time-averaging d'arsonval meter, will average the above-noted uniform current pulses over a predetermined time period to provide an indication proportional to the above-noted rate parameter in accordance with the frequency of uniform current pulses flowing through resistor $R_2$. This indication will be very accurate since the height of each pulse, namely, the current through $R_2$ will be uniform for any pulse due to elimination of any effective temperature variations in the transistor 22. Accordingly, it will be appreciated that temperature variation in the aforementioned prior art transistor switching type of arrangement is overcome thereby advancing the state of the art.

Referring now to FIG. 1a, it is seen that an output 45 of metering means 18 is electrically coupled to monostable means 16. Specifically, output 45 is taken from the emitter electrode 36 of low temperature drift switching means, or transistor 22. Since, as described above, any current flowing from emitter electrode 36 of transistor 22 will be relatively unaffected by wide ranges to temperature, the output 45 to monostable means 16 will assure that monostable means 16 is also relatively unaffected by wide ranges of temperature and hence, increase total circuit integrity. In other words, the output present on line 45 may effectively in a conventional fashion be utilized in conjunction with the monostable means in a reference control function. It should, of course, be evident to those skilled in the art that there are a multitude of monostable devices available of the type referred to with reference to monostable means 16. In those monostable devices which have been designed with temperature change considerations taken into account this output 45 would not need to be employed.

Thus, it is apparent that the new and improved high rate parameter-measuring system of the present invention provides a more effective and electrically unique method for measuring and indicating the speed of an object by eliminating adverse effects of temperature variation and assuring indication linearity.

Having thus described my invention, what I claim is:

1. This invention relates to a high rate parameter-measuring system, said system including
   pulse-squaring means, and
   monostable means, and
   metering means to measure said rate parameter and provide indications of a measured rate,
   said pulse-squaring means having an incoming rate signal indicative of said rate parameter and producing an output containing squared pulses corresponding to said incoming rate signal, said output of said pulse-squaring means associatively electrically coupled to said monostable means,
   said monostable means responsive to each pulse of said output of said pulse-squaring means to provide an output of constant-width pulses at a rate proportional to said rate parameter, said output of said monostable means electrically coupled to said metering means,
   said metering means responsive to said rate of said constant-width pulses from said monostable means to provide a linear indication proportional to said rate parameter,
   said metering means including a low temperature drift switching means relatively unaffected by wide ranges of ambient temperatures which may be intrinsic to the environment of said system to insure said linearity of said indication from said metering means and thereby provide relatively flawless measurement of said high rate parameter,
   said metering means further includes in combination
   said low temperature drift switching means which is a semiconductive device having an input which receives said output of constant-width pulses of said monostable means, and
   constant voltage means, and
   indication means,
   said low temperature drift switching means electrically coupled to said constant voltage means through said indication means and through a preselected reference node such that relatively constant current will flow through said indication means whenever one of said constant-width pulses of said output of said monostable means appears at said input of said low temperature drift switching means,
   said semiconductive device is a transistor having its base electrode electrically connected to said output of said monostable means to receive said constant-width pulses, its emitter electrode connected to said constant voltage means through said indication means, and its collector electrode connected to said constant voltage means through said reference node,
   said constant voltage means includes a resistor impedance means and a Zener diode means, said impedance means supplied by a reference voltage and electrically coupled to said Zener diode means and said indication means, said Zener diode means also electrically coupled to said low temperature drift switching means through said preselected reference node, said constant voltage means providing a constant voltage across said low temperature drift switching means and said indication means.